United States Patent [19]
Guillory

[11] Patent Number: 5,491,991
[45] Date of Patent: Feb. 20, 1996

[54] SECURITY DEVICE FOR AN AUTOMOBILE

[76] Inventor: Samuel L. Guillory, 49 Hampton Ct., Bergenfield, N.J. 07621

[21] Appl. No.: 88,844

[22] Filed: Jul. 8, 1993

[51] Int. Cl.$^6$ ................................................. B60R 25/02
[52] U.S. Cl. ................................................ 70/211; 70/238
[58] Field of Search ........................... 70/209, 211, 212, 70/225, 226, 237, 238, 18, 19; 403/100, 102, 344, 373; 269/238, 268

[56] References Cited

U.S. PATENT DOCUMENTS

| | | |
|---|---|---|
| 304,769 | 9/1884 | Whittleton ............................ 51/217 R |
| 511,430 | 12/1893 | Hubert ........................................ 70/36 |
| 4,131,173 | 12/1978 | Boersma . | 
| 4,444,030 | 4/1984 | Dausch ..................................... 70/209 |
| 4,730,470 | 3/1988 | Zane et al. . |
| 4,738,127 | 4/1988 | Johnson . |
| 4,825,671 | 5/1989 | Wu . |
| 4,829,735 | 5/1989 | Zwissler ................................. 403/190 |
| 4,829,797 | 5/1989 | Wu ........................................ 70/209 |
| 4,915,535 | 4/1990 | Willetts .................................. 403/234 |
| 4,974,433 | 12/1990 | Wang ...................................... 70/211 |
| 5,033,281 | 7/1991 | Kofman et al. . |
| 5,052,201 | 10/1991 | Liou . |
| 5,095,723 | 3/1992 | Lin ........................................ 70/238 |
| 5,129,245 | 7/1992 | Chang . |
| 5,199,283 | 4/1993 | Chen ...................................... 70/209 |
| 5,257,518 | 11/1993 | Hsieh ..................................... 70/238 |
| 5,293,762 | 3/1994 | Kuo ....................................... 70/238 |

FOREIGN PATENT DOCUMENTS 631708  1/1935  Germany ................................. 70/211

Primary Examiner—Steven N. Meyers
Assistant Examiner—Gary Estremsky
Attorney, Agent, or Firm—Morgan & Finnegan

[57] ABSTRACT

An antitheft device for automobiles that inhibits rotation of the steering wheel while preventing the theft of dashboard equipment, such as car stereos. The antitheft device includes a clamp that is secured to the rim of a steering wheel by a housing having a locking mechanism. The housing and locking mechanism also secure an elongate rod thereto. The rod is secured to the housing such that it extends towards the vehicle's dashboard. The rod includes a blocking member secured to its distal end that is positioned in close proximity to the dashboard equipment to prevent its removal. The housing may be adjusted angularly with respect to the clamp while the rod may be adjusted in a telescopic fashion with respect to the housing so that a wide variety of dashboard configurations may be accommodated by the antitheft device. The theft of a car stereo is blocked while rotational operation of the steering wheel is obstructed by the antitheft device extending therefrom.

13 Claims, 13 Drawing Sheets

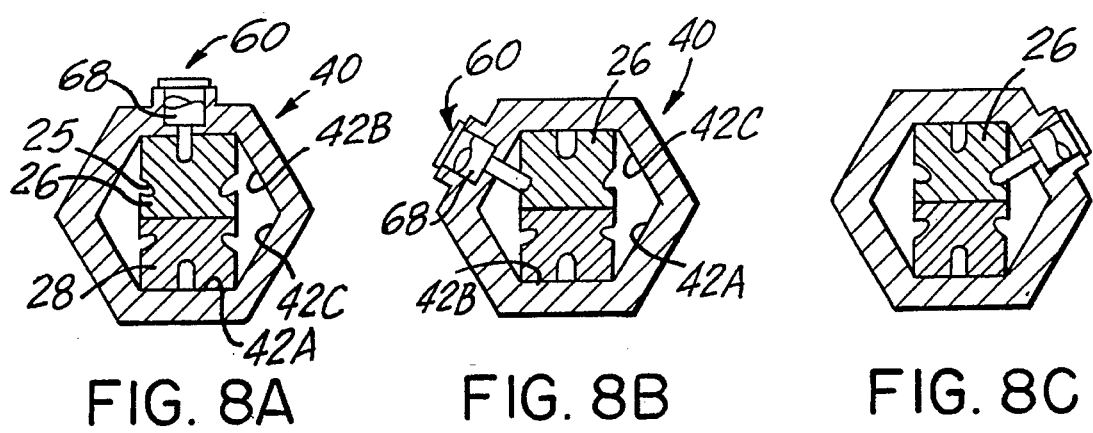

5,491,991

SECURITY DEVICE FOR AN AUTOMOBILE

FIELD OF THE INVENTION

The present invention relates generally to antitheft devices for automobiles, and in particular to an antitheft device which inhibits rotation of the steering wheel while preventing the removal of dashboard equipment, such as a car stereo.

BACKGROUND OF THE INVENTION

Alarm systems for automobiles are known in the art for preventing the theft of an automobile, or the theft of objects inside of an automobile such as stereo receivers, compact disc players, etc. However, alarm systems are of little effect when the automobile is left unattended in a remote area. Moreover, for automobile owners that do not use alarm systems because of their expense or inconvenience (i.e., false alarms), alternative antitheft devices such as those that lock the steering wheel to the brake pedal, or that lock to the steering wheel to obstruct its operation have provided some deterrence to theft of the automobile, but have not protected the dashboard components of the car from theft or vandalism.

For example, U.S. Pat. No. 4,738,127 to Johnson shows a popular antitheft device that hooks onto the opposite sides of the rim of a steering wheel while extending beyond the periphery of the wheel. Rotation of the wheel with this type of device locked in place is limited by the engagement of the extended part of the device with the interior of the car or its driver. Although theft of the automobile may be obstructed by such a device, a thief may still remove or vandalize a stereo receiver or the like while these hook devices are locked to the steering wheel. Therefore, for the owner of an automobile that does not want or cannot afford the expense of an alarm system, there is little protection available that adequately protects both the automobile and its dashboard components from theft.

Even the device disclosed in U.S. Pat. No. 4,974,433 to Wang for locking both the steering wheel and the stereo receiver of a car has limitations in that the device can be quickly overcome. The device disclosed by Wang uses the known diametrically opposed pair of hooks to lock onto the rim of the steering wheel, while extending past the wheel to block the stereo receiver from removal by positioning a plate in front of the receiver. However, the device can still be rotated relative to the steering wheel, allowing the plate to be moved away from the stereo receiver so that the receiver is no longer being blocked. Additionally, the device may have enough play in some applications so that the plate may be pivoted away from the stereo by the hinged arrangement disclosed in one embodiment thereof, or simply unscrewed from the exposed screws disclosed in another embodiment.

The theft of automobiles and of increasingly expensive dashboard components such as stereo receivers, cassette tape and CD players and the vandalism that typically occurs during the theft have added to the spiraling costs of auto insurance. Accordingly, there is a need for an antitheft device that can protect both a car and its dashboard components from theft while overcoming the shortfalls described above.

It is an object of the present invention to provide a security device for an automobile that protects a car from theft while simultaneously protecting dashboard equipment from theft.

It is a further object of the present invention to accomplish the above stated objects by utilizing an apparatus which is simple in design and use, and economical to manufacture.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described.

SUMMARY OF THE INVENTION

In accordance with these and other objects of the present invention, a brief summary of an exemplary embodiment is presented. Some simplifications and omissions may be made in the following summary, which is intended to highlight and introduce some aspects of the present invention, but not to limit its scope. Detailed descriptions of exemplary embodiments adequate to allow those of ordinary skill in the art to make and use the inventive concepts will be provided later.

The invention in its broader aspects contemplates an antitheft device for locking onto the steering wheel of a vehicle to prevent both its operation and the theft of equipment mounted in the vehicle dashboard. The antitheft device includes a clamp having complementary upper and lower clamping members of an arcuate shape and inner diameters slightly larger than the diameter of the steering wheel for receiving the steering wheel therein. The clamp further includes first and second rods extending transversely off of each clamping member, respectively, the first rod and the second rod being pivotally secured together between the ends thereof to provide the clamp with a scissor-like action. The antitheft device further includes a housing having at least one longitudinal channel dimensioned to slidably receive the first and second rods therein when the clamp is closed about a steering wheel rim, and a second channel formed within the housing and extending transversely therethrough. An elongate rod is slidably disposed on one end within the second channel in the housing, having a hinged portion that permits the rod to be folded along side the housing for easy storage. The other end of the elongate rod has a rectangular or alternatively, a spherical shaped member secured thereto that may be positioned in front of a vehicle dashboard to prevent the removal of dashboard equipment. A locking mechanism is provided so that both the elongate rod and the first and second rods may be secured from movement relative to the housing.

BRIEF DESCRIPTION OF THE DRAWINGS

FIG. 8(a)–(c) are diagrammatic views of different locking arrangements of the first and second embodiments of the present invention.

DETAILED DESCRIPTION OF PREFERRED EMBODIMENTS OF THE INVENTION

Figure 1:
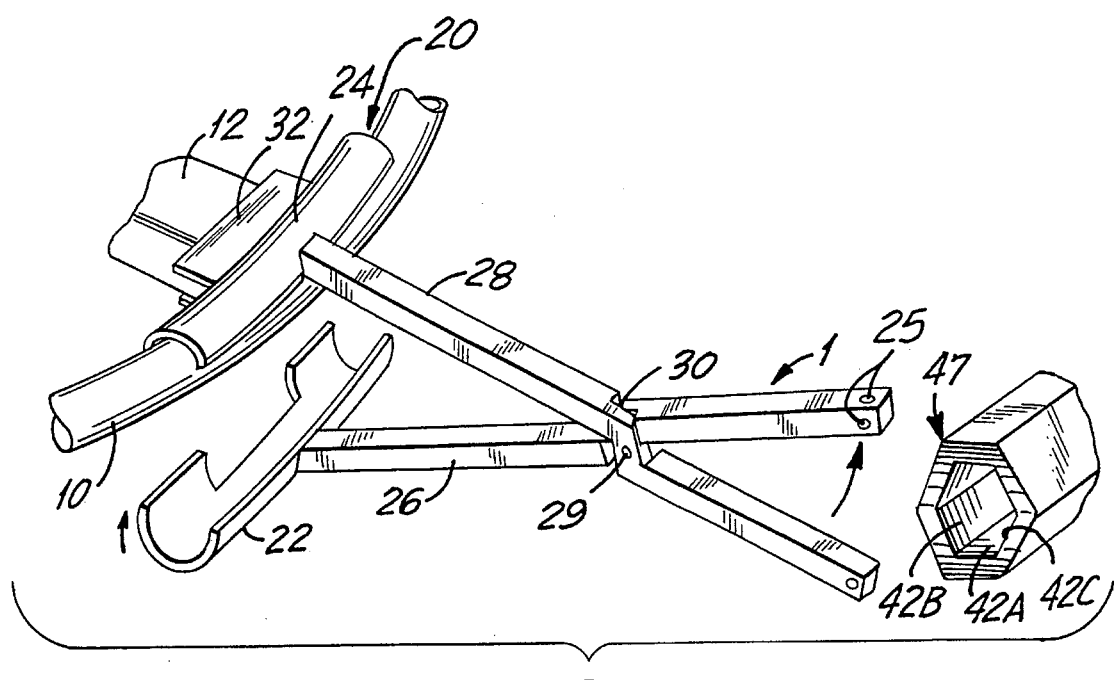
FIG. 1 is an exploded view partial diagram of an antitheft device illustrating a first preferred embodiment of the present invention.

The present invention contemplates an antitheft device for automobiles that protects dashboard equipment such as stereo receivers or the like from vandalism or theft while also preventing the theft of the automobile.

Referring now to the drawings, wherein like numerals refer to like objects, there is disclosed in FIGS. 1–13 broad aspects of the invention. In FIGS. 1–4 and 9–11, a typical automobile steering wheel 10 is shown to which the present invention is secured. The steering wheel 10 does not constitute part of the invention and is provided for illustrative purposes only.

Reference will now be made to FIGS. 1–4. Broadly stated, the antitheft device 1 of the present invention comprises a clamp or clamping device 20 having a lower clamping member 22 and a complementary upper clamping member 24. Both the upper and lower clamping members 22, 24 have a curved, arcuate shape with a radius that is slightly larger than that of a typical automobile steering wheel 10. The complementary shape of the clamping members 22, 24 allows the upper and lower clamping members 22, 24 to receive the rim of a steering wheel 10 therebetween when they are brought together (see FIGS. 2–4).

The lower clamping member 22 further includes a longitudinal rod or arm 26 extending transversely from the outer surface of the clamping member 22. The lower clamp arm 26 is preferably polygonal in its shape to provide at least one flat surface so that it may be secured within the antitheft device 1 in a locking manner. This aspect will be described in more detail below.

Figure 2:
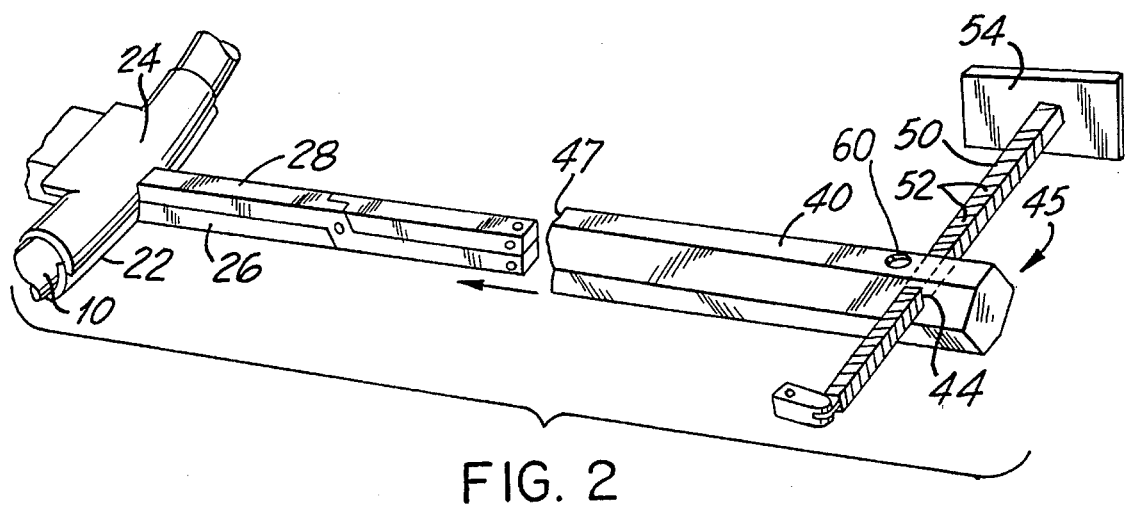
FIG. 2 is an exploded view of an antitheft device illustrating a first preferred embodiment of the present invention in a partially assembled state.

The upper clamping member 24 also includes a rod or arm 28 extending transversely from its outer surface. As shown in FIGS. 1 and 2, the upper clamp arm 28 is pivoted to the lower clamp arm 26 in a scissor-like fashion. The upper clamp arm 28 bends downward near a cutout 30 so that it crosses lower clamp arm 26 as lower clamp arm 26 passes through the cutout 30. This arrangement allows the clamp arms 26, 28 to be brought together abutting each other when the clamping members 22, 24 are brought together, in a tight tolerance that prevents a prying device from getting between the clamp arms 26, 28. The upper clamp arm 28 is pivotally engaged to lower clamp arm 26 by a pin 29 that is disposed in transverse holes (not shown) located in each clamp arm 26, 28 in the area of the cutout 30.

Preferably, the hinge point formed by cutout and pin 29 is located as close as possible to the clamping members 22, 24 while still allowing the distance between the clamping members 22, 24 to be slightly greater than the diameter of the steering wheel 10 when the clamping members 22, 24 are spread apart. In this way, play between the clamping members 22, 24 is minimized when the members are brought together, while still allowing them to be separated enough to allow the rim of the steering wheel 10 to pass therethrough.

The distal ends of the clamp arms 26, 28 include a spherical shaped socket or depression 25 on each of its flat surfaces, except for the flat surfaces of the arms 26, 28 that face each other.

As illustrated in FIGS. 1–4, the upper clamping member 24 further includes a flange 32 that extends transversely from the outer surface of the upper clamping member 24 towards the steering wheel axis. The flange extends outwardly and downwardly from the upper clamping member 24 such that it makes contact with a spoke 12 of the steering wheel 10 when the clamp 20 is placed over the rim and spoke 12 of the steering wheel 10.

Figure 5:
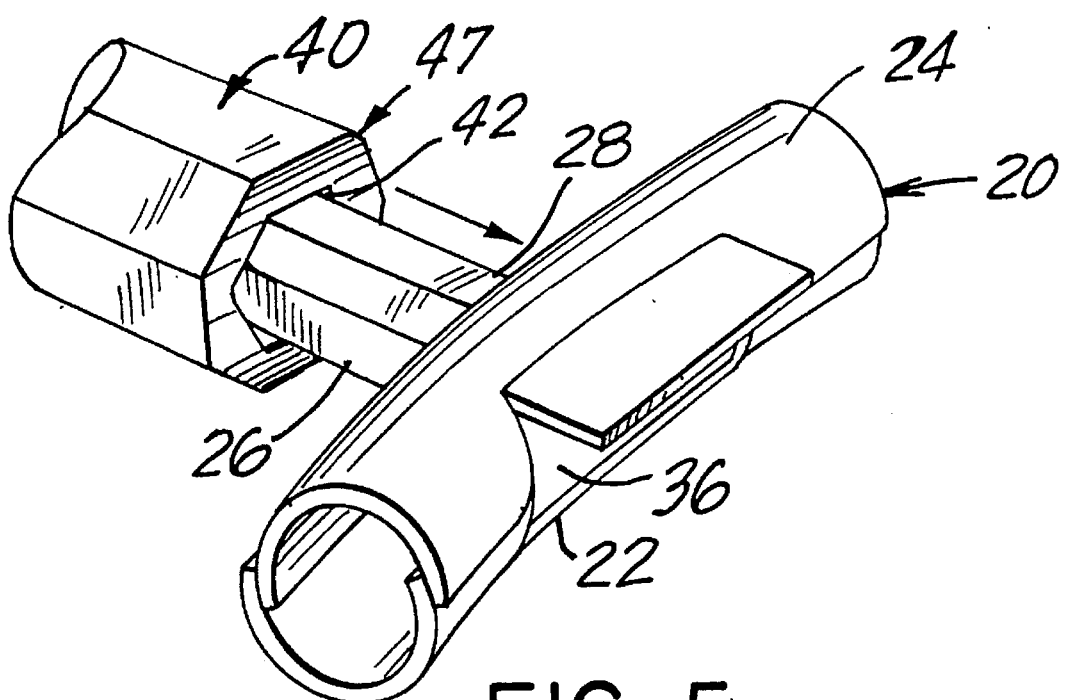
FIG. 5 is a perspective view of a clamp mechanism of all preferred embodiments of the present invention.

Referring to the detailed diagram of the clamp in FIG. 5, the clamp 20 preferably includes a recessed cutout or aperture 36 for receiving the spoke 12 therein. The cutout 36 opening may be dimensioned to receive the largest of the commonly found steering wheel spokes 12. In the preferred embodiment, the cutout has a length of about 2 inches and a width of about 1.25 inches. However, the cutout 36 may have varying dimensions, as long as a large number of spoke 12 sizes can be received therein. It is important to note that the particular dimensions of the cutout 36 are not limited to a particular size since steering wheel styles and dimensions are constantly varying.

The cutout 36 may be embodied as a single cutout on one of the clamping members 22, 24 or alternatively as a pair of opposing complementary cutouts facing each other. In the preferred embodiments of the present invention, the cutout 36 is located mainly on the upper clamping member below flange 32, so that the tightest grip with the least amount of tolerance may be achieved when the clamp 20 is secured to the rim of the steering wheel 10.

Advantageously, the clamping members 22, 24 are dimensioned so that their edges overlap and extend past each other when the clamping members 22, 24 are brought together, to eliminate pry points and prevent them from being forced apart. Additionally, the overlapping edges allows the clamp 20 to receive various steering wheel diameters therein, while still providing a secure clamping action.

The entire clamp 20 (including clamp arms 26, 28) is preferably made from case hardened steel. Additionally, at least the inner surfaces of the clamping members 22, 24 and preferably the entire surface of the clamping members 22, 24 and flange 32 are covered with a durable, nonabrasive plastic coating that protects the steering wheel from getting scratched or damaged.

Turning back to FIGS. 1–4, the antitheft device 1 further includes a housing 40 that is dimensioned to receive the clamp arms 26, 28 therein in a telescopic fashion when the clamp arms 26, 28 are brought together. In the preferred embodiments, the housing 40 is elongate, having a plurality of longitudinal channels 42 A, B, C therein (see FIG. 1). The interior is polygonal in cross section thereby forming interior walls, opposing parts of which define channels 42 A, B, C. Each channel 42 has cross-sectional dimensions that are slightly larger than the cross-sectional dimensions of the two clamp arms 26, 28 when they are brought together, to slidably receive the clamp arms 26, 28 therein in a low tolerance fit.

The channels 42 A, B, C have transverse axes that intersect and are generally spaced apart at even intervals. For example, in the preferred embodiment the housing 40 contains three separate channels 42 A, B, C. Here the axes of the channels are preferably spaced apart from each other by about 60°. Similarly, if the interior of housing 40 is octagonal in cross section so that it defines four channels (not shown), the axes of the channels are preferably located about 45° apart. It should be noted, that although it is preferred to have the axes spaced evenly apart for symmetry, the present invention is not limited as such, in that the housing 40 may contain a plurality of channels with axes disposed at any angular location.

Figure 3A:
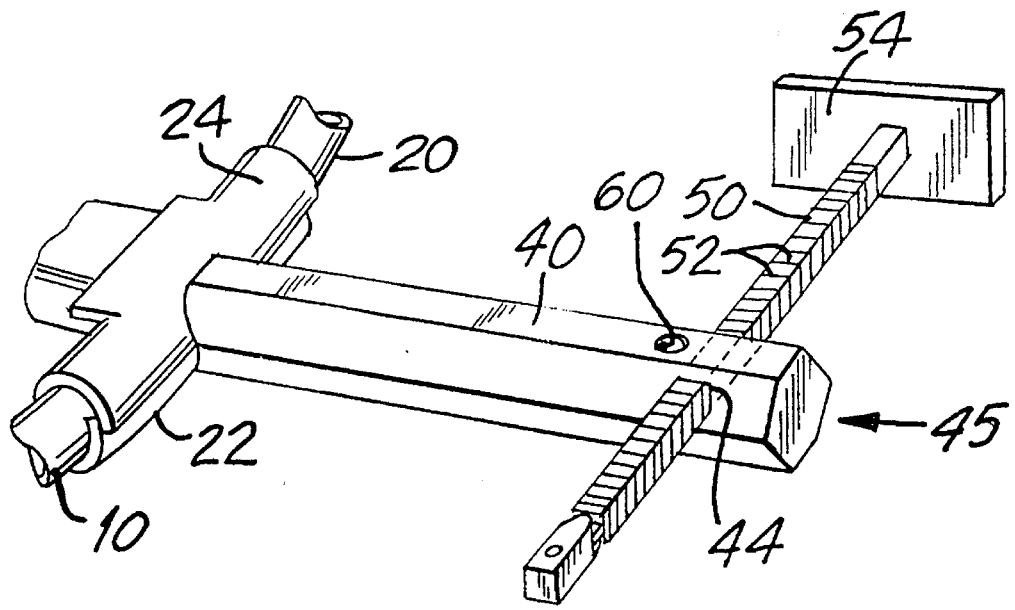
FIG. 3a is a perspective view of an antitheft device illustrating a first preferred embodiment of the present invention in a completely assembled state and secured to a vehicle steering wheel.

In the preferred embodiments, the housing 40 is dimensioned longer than the clamping arms 26, 28 so that the clamping arms may be completely received within the housing 40 (see FIG. 3a ). The housing 40 is preferably sealed on the end 45 distal to the clamp 20. On the proximal end 47 the housing 40 is preferably shaped with a curvature that is complementary to the shape of the clamp 20. Advantageously, when the housing 40 completely encompasses the clamping arms 26, 28 to abut against the clamp 20, the clamp 20 and its clamping arms 26, 28 are completely shielded from prying, having no external pry points.

Figure 3B:
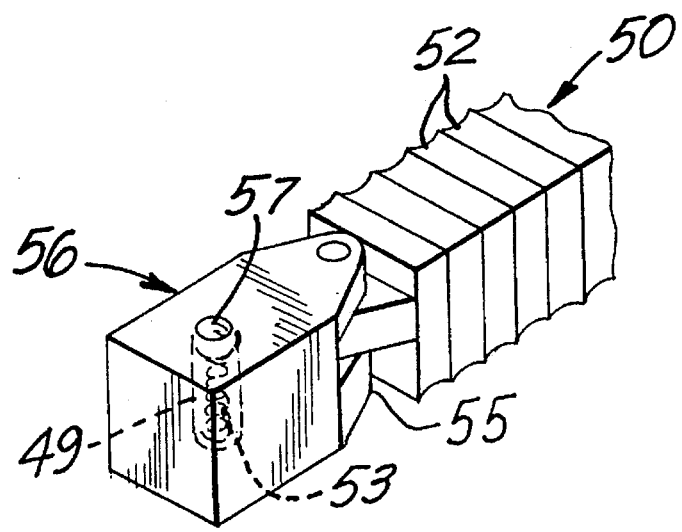
FIG. 3b is a perspective view of one end of a rod portion of an antitheft device according to all preferred embodiments of the present invention.
Figure 4:
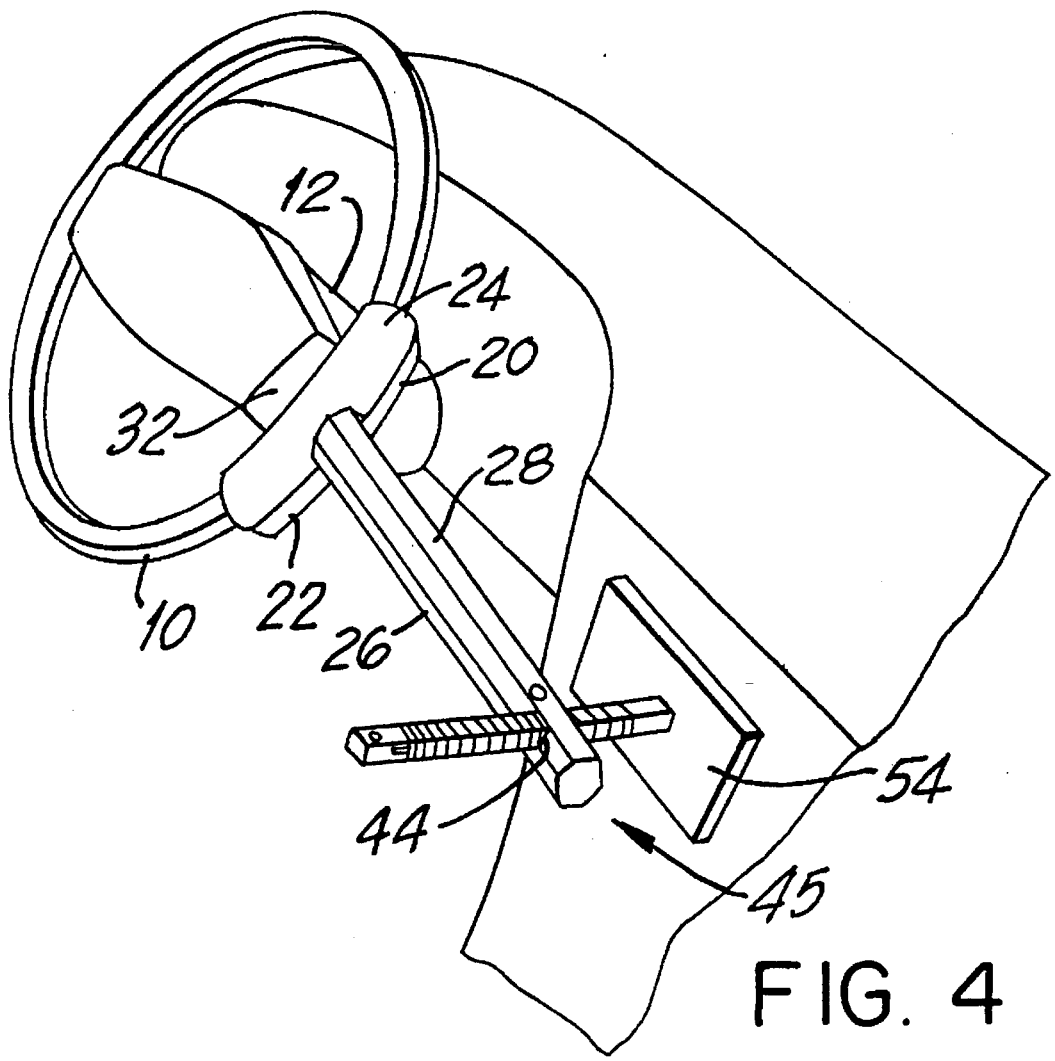
FIG. 4 is perspective view of an antitheft device illustrating a first preferred embodiment of the present invention secured in position in a vehicle interior.

The housing 40 further includes a second or transverse channel 44 that extends laterally across the housing 40, preferably located just slightly rearward of the end of the clamping arms 26, 28 when the arms 26, 28 are completely encompassed by housing 40 (see FIGS. 2–4). The transverse channel 44 is polygonal in cross section, e.g., being square and having substantially flat surfaces therein.

An elongate rod 50 is disposed within the transverse channel 44. The rod 50 has cross-sectional dimensions just smaller than the cross-sectional dimensions of the transverse channel 44 so that the rod 50 may be closely received therein. Advantageously, the flat surfaces of the transverse channel 44 prevent rotation of the rod 50 while it is positioned therein. The rod 50 further includes a plurality of octagonal grooves 52 spaced along its longitudinal axis for a major portion of the length of the rod 50.

The rod 50 includes a blocking member or device, preferably a plate 54 secured to one end thereof. The plate 54 is illustratively in a plane substantially perpendicular to the axis of rod 50 and serves to block the removal of any components in the vehicle dashboard when the plate 54 is positioned in close proximity thereto. The plate 54 may optionally include any number of finger-like projections (not shown) extending off of its surface that may provide some interlocking arrangement with the dashboard component to further obstruct its removal.

It is preferable that the plate 54 have a generally rectangular shape to provide protection to as wide a range as possible of different component and dashboard configurations. To this end, the rod 50 with the plate 54 may be orientated between different positions by removing the rod 50 from the channel 44 and rotating it before reinserting it in the channel 44.

Figure 6:
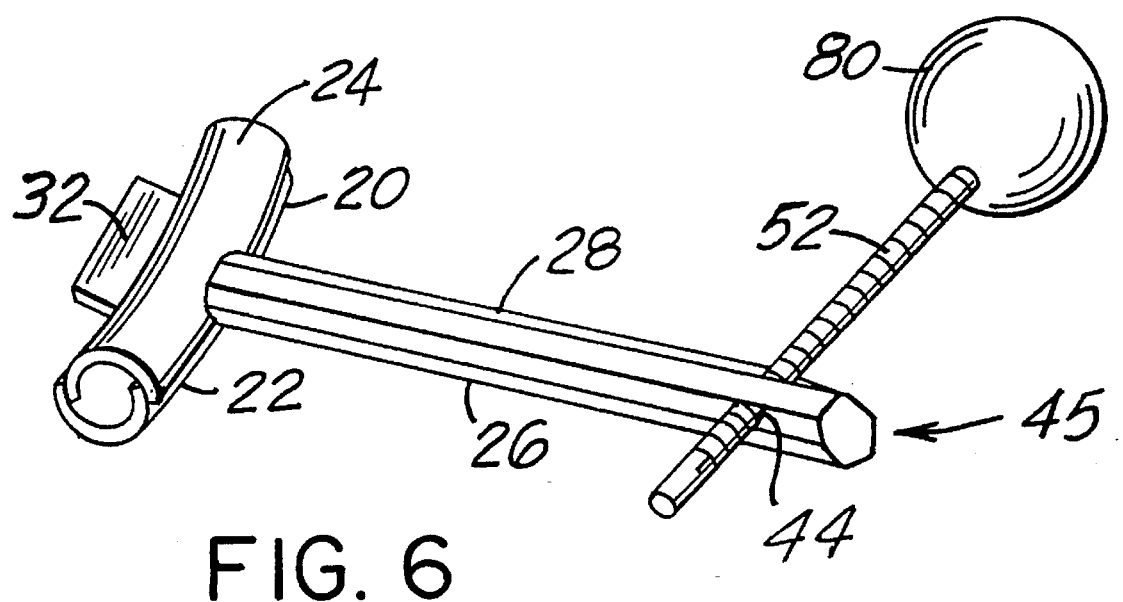
FIG. 6 is a perspective view of an antitheft device illustrating a second preferred embodiment of the present invention.

In another embodiment, the rod 50 may have a spherical shaped blocking member 80 or a flat disc-shaped member (not shown) secured to one end in place of the plate 54, as shown in FIG. 6. The spherical shaped member 80 would be large enough in size to block any dashboard component from being pulled out. In this embodiment, it is not necessary that the rod have flat sides that prevent rotation, and a cylindrical rod having annular grooves may be used. As can be understood, the manufacturing cost for a cylindrical rod 50 having longitudinally spaced octagonal grooves may be less than a rod 50 having flat surfaces and a similar arrangement of grooves. Moreover, a cylindrical rod does not provide any secure pry points.

Referring to FIG. 3b, in all embodiments of the rod 50, the end of the rod 50 that is not secured to the blocking member 54 includes a hinged portion 56 that allows for easy storage of the antitheft device 1. The hinged portion 56 may be disposed in the channel 44, with a hinge 55 remaining exposed so that the rod 50 may be folded towards the housing 40, thus providing a more compact unit for storage (see FIG. 13).

Figure 13:
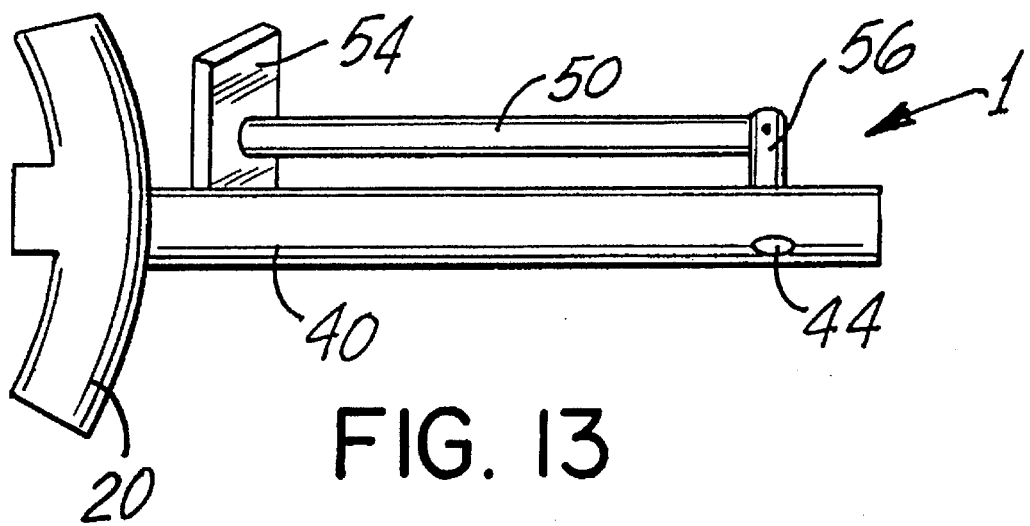
FIG. 13 is a perspective view of an antitheft device according to all preferred embodiments of the invention in a compacted, easy storage arrangement.

The hinged portion 56 includes a bore 49 for housing a detent ball 51 that is biased outward by a spring 53. The ball 51 is retained by a ring (not shown for clarity) that allows only a portion of the ball 51 to project beyond the surface of the hinged portion 56. With this detent arrangement, the rod 50 may be folded at the hinge 55 (as illustrated in FIG. 13) while the hinged portion 56 is disposed in the channel 44 (with the hinge 55 extending outside of the channel 44). The detent ball 51 prevents the hinged portion 56 from unintentionally sliding out of the channel 44. However, by applying sufficient force to overcome the force of the spring 49, the rod 50 including the hinged portion 56 may be completely pulled through the channel 44 to allow for rotation of the rod 50 for different orientations of the plate 54.

Figure 7A:
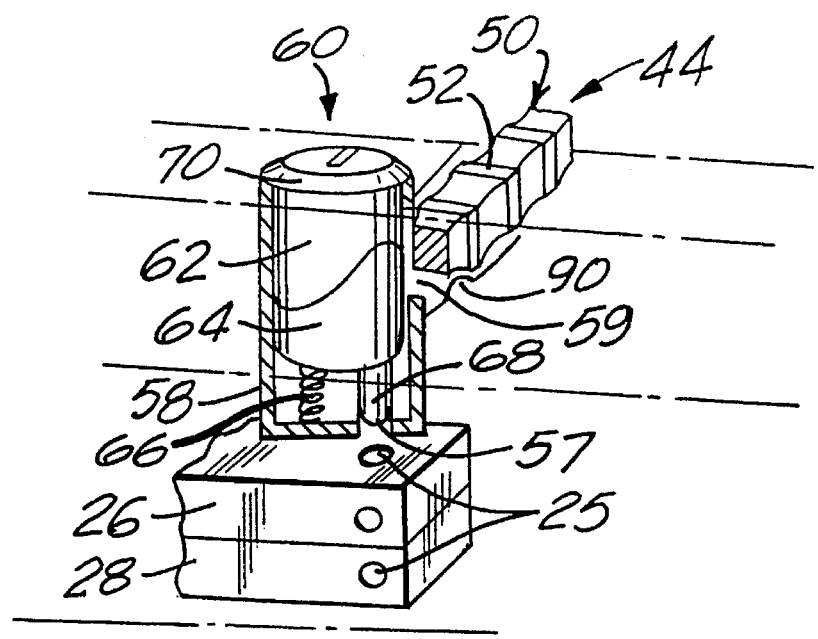
FIG. 7(a)–(b) is a partially cutaway view of a lock mechanism of the first and second embodiments of the present invention, shown in an unlocked and locked position, respectively.
Figure 7B:
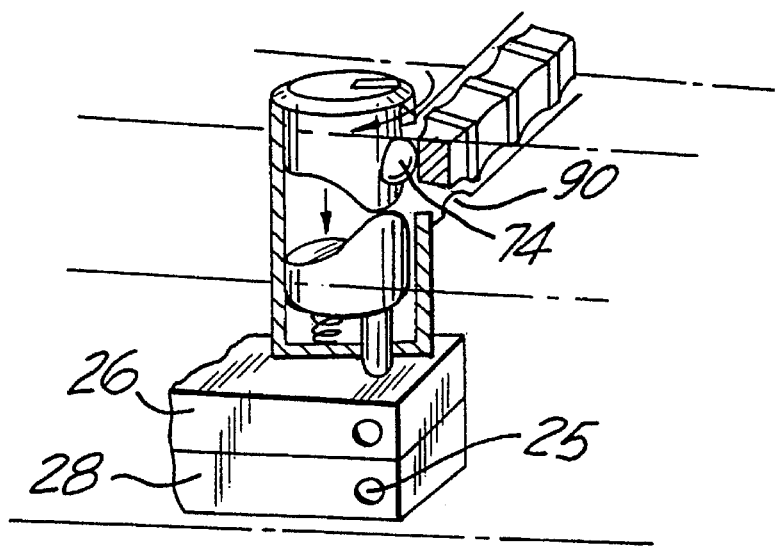

As shown in FIG. 2, the housing 40 also includes a radial aperture or bore 58 for receiving a locking mechanism 60, such as a key-orientated lock cylinder shown in detail in FIG. 7(a)–(b). The locking mechanism 60 should be a high quality tamper-resistant lock cylinder that is not easily picked or overcome, such as the lock cylinders sold by MEDCO, Inc.

The diameter of the bore 58 is dimensioned to receive the locking mechanism 60 therein. The bore 58 and lock mechanism 60 are positioned in close proximity to both the channel 42 A and the transverse channel 44. Advantageously, the bore 58 includes apertures 57 and 59 that communicate with the channels 42 and 44 respectively, permitting the use of one locking mechanism 60 to secure both the clamping arms 26, 28 and the rod 50 from movement relative to the housing 40.

FIG. 7a illustrates the locking mechanism 60 in an unlocked position, as arranged with the clamp arms 26, 28 and the rod 50 disposed in the housing 40. The locking mechanism 60 includes an upper locking member 62 that is cylindrical in shape. Notably, the upper locking member 62 includes a generally smooth cam shape along its bottom surface. A lower locking member 64 having a complementary cam shape on its upper surface is positioned below the upper locking member 62 in bore 58. A spring 66 biases the lower locking member 64 against the upper locking member 62 to form a substantially continuous cylindrical shape when in the unlocked position. A retainer ring 70 is provided to prevent vertical movement of the upper locking member It should be understood that although the upper locking member 62 is restrained from vertical movement by the retainer ring 70, rotational movement of the locking mechanism 60 is not prevented by the retainer ring 70.

The lower locking member 64 further includes a peg 68 extending longitudinally from the lower end of the locking member 64. The peg 68 is off-center from the axis of the locking members 62, 64, and engages aperture 57 slightly to prevent any rotational movement of the lower locking member 64. The distal end of peg 68 is preferably spherical in shape, and dimensioned to be received in any one of the plurality of spherical shaped sockets 25 located on the ends of clamp arms 26, 28.

FIG. 7b illustrates the locking mechanism in a locked position, which secures both the clamp arms 26, and the rod 50 from movement relative to the housing 40. In FIG. 7b, the upper locking mechanism 62 is rotated about 90° while the lower locking mechanism 64 is prevented from rotation due to the disposition of peg 68 in aperture 57. In this locked position, the engaging cam surfaces of the upper and lower members 62 and 64 are illustratively disposed such that a low point of the upper locking member 62 is in contact with a high point of the lower locking mechanism 64, causing axial displacement of the lower locking member 64 against the force of the spring 66. This cam-type action allows the peg 68 to be disposed through the aperture 57 to lockably engage one of the sockets 25 on the clamp arms 26, 28.

The upper locking member 62 also includes a protuberance 74 extending transversely therefrom and having a diameter dimensioned to engage the grooves 52 of the rod 50. When the upper locking mechanism 62 is rotated to the locked position shown in FIG. 7b, the protuberance 74 is interlocked with a groove 52 to prevent movement of rod relative to the protuberance 74. Accordingly, the single locking mechanism 60 can be set to a locked position such that both the rod 50 and the clamp arms 26, 28 may be locked to the housing 40, or the locking mechanism can be set to an unlocked position that allows movement of the rod 50 and the clamp arms 26, 28 relative to the housing 40.

The housing 40 may optionally include a leaf spring 90 located in the channel 44 opposite the location of the protuberance 74 when the locking member 60 is in a locked position. The leaf spring 90 provides a ratcheting effect with the grooves 52 when the rod 50 is moved axially through the channel 44, and serves to align the rod 50 for engagement with the protuberance 74. When the leaf spring 90 is aligned with a groove 52, the protuberance 74 may also be aligned with the same groove 52 on the opposite side. Alternatively, as provided in the hinged portion 56, a detent ball (not shown) that is biased forward towards the rod 50 by a spring (not shown) may be used instead of the leaf spring 90. The detent ball and spring may be housed in a bore that is substantially perpendicular to the channel 44 and retained therein by a ring (not shown).

FIG. 8 illustrates varying positions that the housing 40 may be set to with respect to the clamp arms 28. As can be seen, the rotational orientation of the housing 40 depends on which channel 42 the clamp arms 26, are disposed in. When the clamp arms 26, 28 are disposed in channel A (shown in FIG. 8a), the locking mechanism 60 is positioned above the clamp arm 26 such that the peg 68 engages a socket 25 in the upper surface of the clamp arm 26. In this position, the rod 50 extends in an outward direction so that the plate 54 (not shown) can be positioned to block the removal of a component located in the center area of the dashboard of the vehicle.

Positioning the clamp arms 26, 28 in channel B (shown in FIG. 8b) allows the plate 54 to be positioned so as to block a dashboard component that is placed in the lower area of the dashboard, while the locking mechanism securely engages a socket 25 in the side of the clamp arm 26. Placing the clamp arms 26, 28 in channel C (shown in FIG. 8c) protects a dashboard component located in the upper area of the dashboard. Here the locking mechanism 60 engages a socket 25 on the opposite side of clamp arm 26.

As can be appreciated, a user may be able to adjust the height of the plate 54 between four different positions when the housing 40 is embodied with four channels that are positioned at 45° intervals. It will be understood that regardless of the channel 42 in which the clamp arms 26, 28 may be located, the peg 68 of the lower locking member 64 can be secured to the clamp arms 26, 28 by lockably engaging one of the sockets 25.

The housing 40, the rod 50, and the plate 54 are preferably made of case-hardened steel to resist tampering. The plate 54 may be covered with a durable, non-abrasive plastic coating to protect the dashboard from unintentional damage.

In operation, a user may place the clamp 20 about the rim and spoke 12 of a vehicle steering wheel 10, with the spoke 12 received in the recessed cutout 36. The clamping members 22, 24 are brought together over the steering wheel 10, with their edges overlapping. At the same time, the clamp arms 26, 28 are pivoted together.

Depending on the orientation, the housing 40 is slid over the clamp arms 26, 28, with the clamp arms 26, 28 received in either of the channels 42 A, B, or C. The proximal end 47 of the housing 40 is positioned against the side of the clamping members 22, 24.

Next, the desired orientation of the plate 54 is selected and the rod 50 is disposed in the transverse channel 44. The position of the rod 50 is adjusted so that the plate 54 is in close proximity to the dashboard component that is to be blocked. The user then simply sets the locking mechanism 60 to a lock position by turning the key that comes with the locking mechanism 60. The antitheft device 1 of the present invention is now securely in place to prevent the theft of dashboard equipment and the theft of the vehicle.

Thus, with the vehicle's steering wheel 10 locked by a column lock, the antitheft device 1 can be secured to the rim and spoke 12 of the steering wheel 10 to provide a formidable deterrence to both the theft of the vehicle by obstructing the full rotation of the steering wheel 10, and to the theft of the dashboard components protected by the plate 54 or spherical member 80. The adjustable arrangement of the rod 50 with respect to the housing 40, the variable orientation of the plate 54, and the plurality of channels 42 available to orientate the housing 40 with respect to the clamp 20 allows the antitheft device 1 to be compatible for use with a wide variety of vehicle dashboard arrangements.

Figure 9:
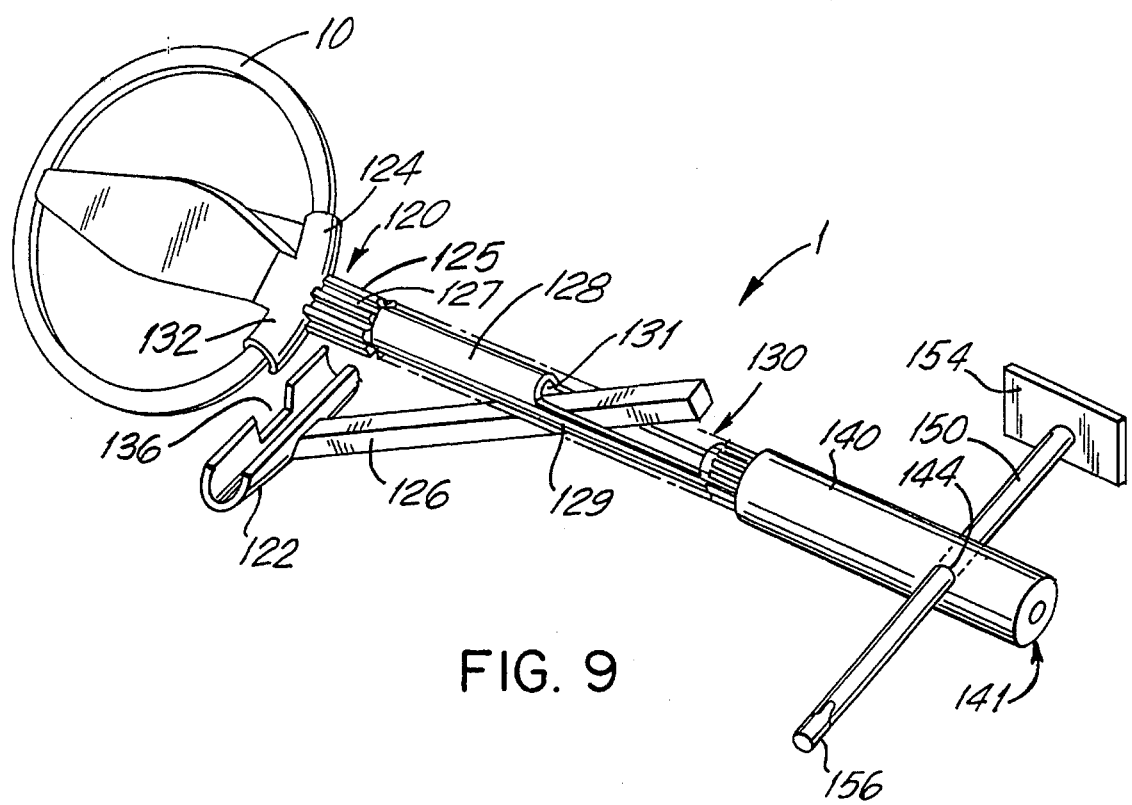
FIG. 9 is a perspective view of an antitheft device illustrating a third preferred embodiment of the present invention.
Figures 10A, 10B:
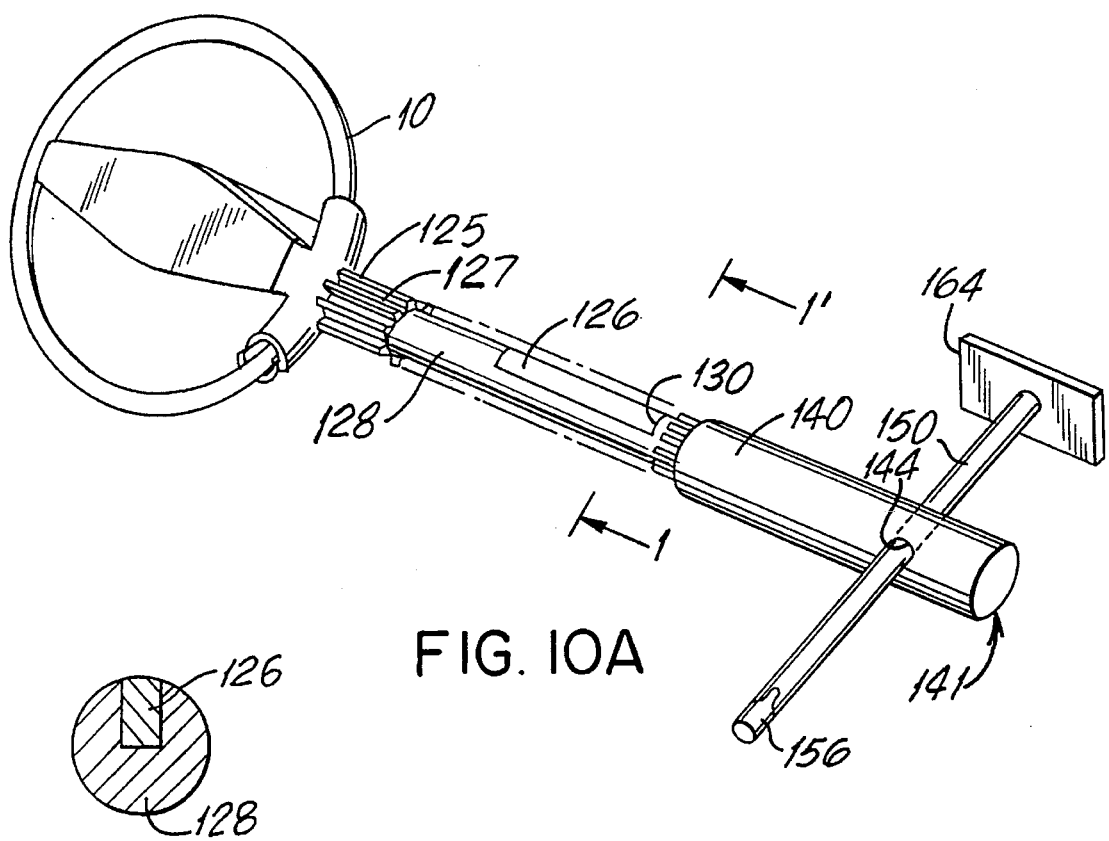
FIG. 10(a) is a perspective view of the third preferred embodiment of an antitheft device in a partially assembled state.
FIG. 10(b) is a cross-sectional view taken along line 1–1' in FIG. 10(a).
Figure 11:
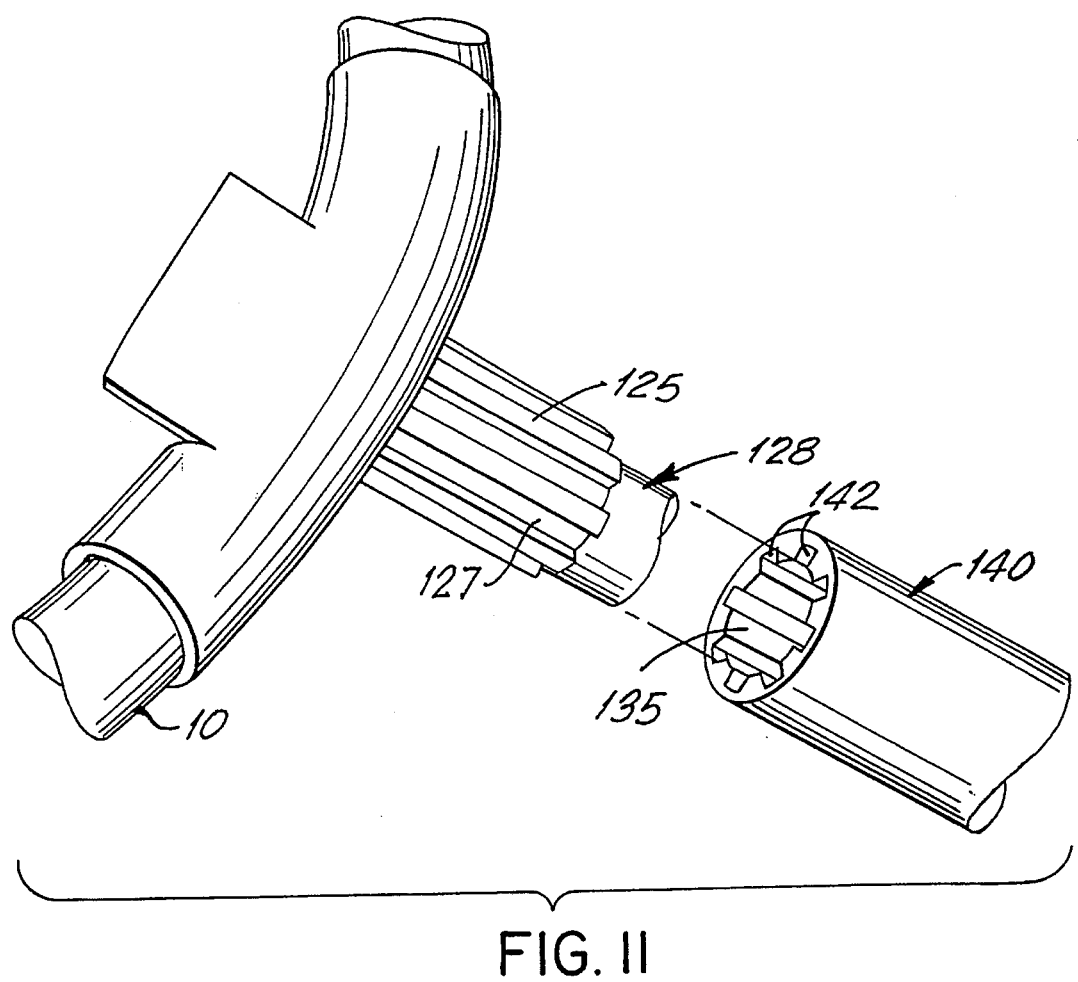
FIG. 11 is a partially cutaway view of a part of the third preferred embodiment of an antitheft device according to the invention.

FIGS. 9–11 illustrate an additional embodiment of the antitheft device 1 of the present invention. Reference will now be made to FIG. 9. Similar to the first embodiment described above, the antitheft device 1 of the present invention includes a clamp 120 have a flange 132 and a recessed cutout 136 to secure the antitheft device 1 to the steering wheel 10 of a vehicle.

The clamp 120 includes a lower clamping member and a complimentary upper clamping member 124. The lower clamping member 122 includes a lower arm 126 extending transversely therefrom, preferably having a rectangular shape. Likewise, the upper clamping member 124 is secured to an upper arm 128 that similarly extends transversely therefrom. In this embodiment, the upper arm 128 is circular in shape, having a plurality of alternating longitudinal teeth 125 and grooves 127 that extend around the periphery of the upper arm 128. It should be noted that it is preferable that the teeth 125 and grooves 127 extend along most of the length of the upper arm 128 (not shown for clarity) for ease of use considerations. However, it will be apparent from the description herewith that the invention is not limited as such in that practice of the invention may be accomplished with a tooth 125 and groove 127 arrangement that extends along the upper arm 128 only a short distance from the abutting edge of upper clamping member 124 (as shown in solid lines in FIGS. 9–11). In the preferred embodiment, the teeth 125 and grooves 127 extend around the outer perimeter of the upper arm 128 and are substantially rectangular in shape.

The upper arm 128 includes a slotted recessed area 131 that extends from the outer circumference of the underside of upper arm 128 into the center area of the upper arm 128, along most of the length of the upper arm 128. The recessed area 131 is dimensioned to be slightly larger than the cross-sectional dimensions of the lower arm 126, so that the lower arm 126 may be completely received within the upper arm 128 when the clamping members 122 and 124 are brought together (see FIGS. 10(a) and 10(b). In the preferred embodiment, the recessed area 131 extends longitudinally from the clamp member 124 along the upper arm 128 a length sufficient to receive the lower arm therein.

The upper arm 128 and the lower arm 126 are pivotally connected together about their midpoints in a scissor-like fashion by hinge pin 129.

Returning to FIG. 9, to allow for the pivoting of one arm relative to the other, upper arm 128 further includes a longitudinal cutout 130 that extends through the upper arm 128 into the recessed area 131. The cutout 130 is dimensioned just wider than the width of the lower arm to allow the distal end of the lower arm 126 to pass therethrough when the lower arm 126 is pivoted with respect to the upper arm 128.

The antitheft device 1 further includes a housing 140 and an elongate rod 150 having a plate 154 secured to one end of the rod 150. The elongate rod 150 is disposed in a channel 144 that is generally transverse to the housing 140 and located near the housing end 141. As in the previous embodiments, the rod 150 preferably contains a hinged portion 156 that facilitates in the storage of the antitheft device 1.

In FIG. 11, there is illustrated in greater detail the upper arm 128 and the housing 140. As can be seen, the housing includes a lumen 135 having a plurality of grooves 142 extending longitudinally therethrough. The grooves 142 are dimensioned to matingly engage to the tooth 125 and groove 127 arrangement on the outer surface of the upper arm 128 when the upper and lower arms 128, 126 are inserted together within the housing 140.

Figure 12A:
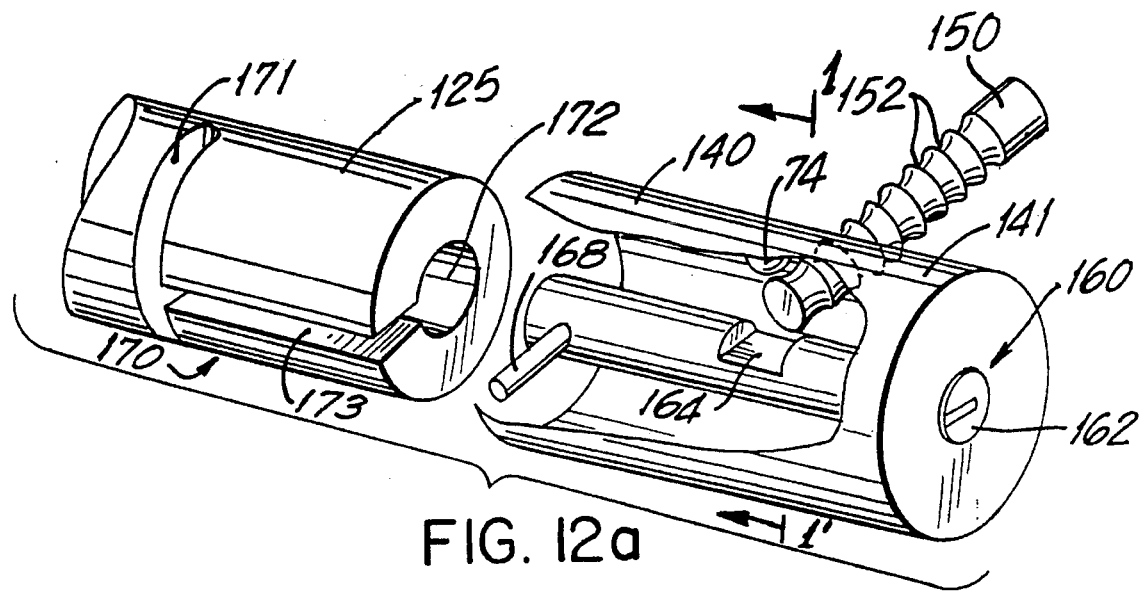
FIG. 12(a) is a partially cutaway view of a lock mechanism of the third preferred embodiment of an antitheft device according to the invention.
Figure 12B:
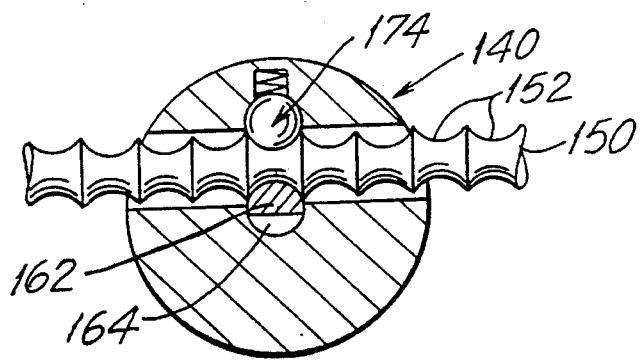
FIG. 12(b) is a cross-sectional view taken along lines 1–1' in FIG. 12(a).

Referring now to FIGS. 12(a) and 12(b), the distal end 200 of the upper arm 128 includes a receptacle 170 for a locking mechanism 160. The receptacle 170 includes a transverse semi-circular cutout 171 that is disposed between the end 200 and the cutout 130 (not shown), and which extends through about one half of the upper arm 28, as shown in FIG. 12 (a).

An axial, circular shaped centered bore 172 extends from about the cutout 171 through the end 200 of the upper arm 128. In addition, a longitudinal channel 173 extends from the cutout 171 to the end 200 of the upper arm 128. The channel 173 further extends radially from the bore 172 to the outer circumference of the upper arm 128. Preferably, the width of the channel 173 is substantially equal to the width of the cutout 171. The cutout 171, the bore 172, and the channel 173 are all in communication with each other.

The locking mechanism 160 is located in the distal end 141 of the housing 140 and is arranged so as to simultaneously lock both the clamp 120 and the rod 150 having grooves 152 to the housing 140 to prevent movement relative thereto. The locking mechanism 160 includes a key-oriented lock cylinder 162 that is preferably mounted coaxially within the distal end 141 of the housing 140 (see FIG. 12). The lock cylinder 162 is rotatably secured to the housing allowing complete rotation of the lock cylinder 162 relative to the housing 140. The diameter of the lock cylinder 162 is slightly smaller than the diameter of the bore 172 so that the lock cylinder 162 may be slidably received therein in a low tolerance fit. As will be understood from the description below, it is preferable that the diameter of the lock cylinder 162 be about the same diameter as the diameter of the grooves 152 on rod 150. Additionally, the length of the lock cylinder 162 is substantially equal to the length of the bore 172.

A peg 168 is transversely secured to the lock cylinder 162 just proximal to the end of the lock cylinder 162 that is opposite the end secured to the housing 140. The peg 168, which may be flat-edged or circular, has a cross-sectional dimension that is slightly smaller than the width of the channel 173, while its length is less than the radial depth of the channel 173, so that it may be received in the channel 173.

As shown in FIG. 12(a), a cutout 164 is located on the outer circumference of the lock cylinder 162, between the ends thereof. The cutout 164 is provided to allow passage of the rod 150 therethrough. The lock cylinder 162 is generally semi-circular in shape below the cutout 164 so that it engages the grooves 152 of the rod 150 when the lock cylinder 162 is rotated by a key (see FIG. 12(b)). A detent ball 174 arrangement similar to the detent ball 51 arrangement shown in FIG. 3(b) is located opposite the cutout 164 in the channel 144 above the rod 150. The detent ball 174 engages the side of a groove 152 opposite that of the cutout 164.

During use, the antitheft device i shown in FIGS. 9–12 may be operated in a similar manner as the first embodiment describe above. The clamp 120 is secured to the steering wheel 10 and spoke 12. The housing 140 is slid over the clamp arms 126, 128, and the rod 150 with the blocking plate 154 is adjusted telescopically towards the dashboard. As can be appreciated, the tooth 125 and groove 127 arrangement of the upper arm 128 and the interlocking housing 140 provide for many orientations of the housing 140 and consequently the positioning of the plate 154 with respect to the vehicle dashboard. Once set up, the housing 140 is locked to the clamp 120 and the rod 150 using the lock 160. The antitheft device 1 now secures any dashboard equipment from theft, while obstructing the drivability of the vehicle.

In addition to providing an obstacle to stealing the vehicle, the antitheft device 1 has been described primarily for protecting dashboard components such as stereo receivers, cassette and compact disc players, etc. However, it will be understood that the described device can also be used to block movement of a transmission selector or hand brake lever mounted on a center console of the vehicle by adjusting the orientation of the housing 40, 140 with respect to clamp 20, 120 while adjusting the extension and orientation of the rod 50, 150 with respect to the housing 40, 140.

Moreover, although the invention has been described in detail with particular reference to several preferred embodiments, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

I claim:

1. An antitheft device for protecting a vehicle and dashboard components of a vehicle from theft, comprising:

a clamp having two clamp arms disposed in a scissor-like arrangement, said clamp having arcuate members for engaging the rim of a steering wheel therein;

a housing having a locking means for releasably securing said housing to said clamp, said housing thereby forming a unified exterior of the clamp wherein said housing can be secured to said clamp at a plurality of different angular locations;

a rod releasably secured to said housing by said locking means; and a blocking member secured to one end of said rod for blocking the removal of dashboard components.

2. An antitheft device for protecting a vehicle and dashboard components of a vehicle from theft, comprising:

a clamp having two clamp arms disposed in a scissor-like arrangement, said clamp having arcuate members for engaging the rim of a steering wheel therein;

a housing having a locking means for releasably securing said housing to said clamp, said housing thereby forming a unified exterior of the clamp;

a rod releasably secured to said housing by said locking means; and a blocking member secured to one end of said rod for blocking the removal of dashboard components, wherein said blocking member is a substantially rectangular shaped plate.

3. An antitheft device for protecting a vehicle and dashboard components of a vehicle from theft, comprising:

a clamp having two clamp arms disposed in a scissor-like arrangement, said clamp having arcuate members for engaging the rim of a steering wheel therein;

a housing having a locking means for releasably securing said housing to said clamp, said housing thereby forming a unified exterior of the clamp;

a rod releasably secured to said housing by said locking means wherein said rod includes a hinged portion having a hinge that allows said rod to be pivoted at said hinge while said hinged portion is secured to said housing, so that said rod may be disposed substantially parallel to and in close proximity to said housing for compact storage of said antitheft device; and a blocking member secured to one end of said rod for blocking the removal of dashboard components.

4. A locking attachment for locking onto the steering wheel of a vehicle to prevent its operation and the theft of equipment mounted in the vehicle dashboard, comprising:

a clamp comprising a lower clamping member having an arcuate shape and an inner diameter slightly larger than the diameter of the steering wheel for receiving the steering wheel therein, said lower clamping member having a first rod extending transversely thereof; said clamp further comprising an upper clamping member having an arcuate shape and an inner diameter slightly larger than the diameter of the steering wheel for receiving the steering wheel therein, said upper clamping member having a second rod extending transversely thereof, said first rod and said second rod being pivotally secured together between the ends thereof;

a locking means;

a housing comprising at least one longitudinal channel dimensioned to slidably receive the distal ends of said first and said second rods when said upper and lower clamping members are brought into close proximity, a second channel formed within said housing and extending transversely therethrough, and an aperture in communication with said first and second channels for receiving and securing said locking means therein; and a third rod slidably disposed on one end within said second channel in said housing, said third rod having a proximal and a distal end, said distal end having a plate secured thereto.

5. A locking attachment according to claim 4 wherein said clamp includes a recessed cutout between said clamping members through which a spoke of the steering wheel is received when said upper and lower clamping members are brought together and secured to a rim of the steering wheel.

6. A locking attachment according to claim 4 wherein said upper clamping member includes a flange extending transversely outward from the outer surface thereof substantially opposite to the direction of said second rod, to interfere with the rotation of said clamp about the rim of the steering wheel by contacting the upper surface of a spoke of the steering wheel.

7. A locking attachment according to claim 4 wherein the edges of said upper clamping member overlap in an interleaving manner with the edges of said lower clamping member to prevent prying when said clamping members are brought together in a closed position.

8. A locking attachment according to claim 4 wherein said housing comprises three longitudinal channels having central axes spaces 60° apart from each other.

9. A locking attachment according to claim 4 wherein said housing comprises four longitudinal channels having central axes spaces 45° apart from each other.

10. A locking attachment according to claim 4 wherein said housing comprises a plurality of channels for engaging said second rod in a plurality of angular orientations.

11. A locking attachment according to claim 4 wherein said locking means includes a means for simultaneously securing both of said first and second rods and said third rod against movement relative to said housing when said locking means is set to a locking position.

12. A locking attachment according to claim 4 wherein said third rod includes a plurality of peripheral groves axially spaced along a major portion of its length so that said third rod can be fixedly secured by said locking means at a plurality of locations along its length regardless of the orientation of said third rod.

13. A locking attachment according to claim 4 wherein said locking means comprises a lock cylinder having a substantially spherical shape at its distal end, and each of said first and second rods includes a receiving socket on at least one of the surfaces of said first and second rods to matingly receive the spherical end of said lock cylinder therein and restrict axial movement of said first and second rods with respect to said housing.

* * * * *